UNITED STATES PATENT OFFICE.

FRIEDRICH ERNST FERDINAND NEUMANN, OF WANDSBEK, NEAR HAMBURG, GERMANY.

METHOD OF PRODUCING COCOA POWDER.

1,032,931.  Specification of Letters Patent.  Patented July 16, 1912.

No Drawing.   Application filed January 4, 1910.  Serial No. 536,407.

*To all whom it may concern:*

Be it known that I, FRIEDRICH ERNST FERDINAND NEUMANN, a subject of the King of Prussia, and resident of Wandsbek, near Hamburg, Germany, have invented a new and useful Method of Producing Cocoa Powder, of which the following is a specification.

The methods for producing cocoa-powder known heretofore present considerable technical difficulties and moreover result in drawbacks, which are not only felt in carrying out the fabrication, but also injuriously affect the quality of the product. Thus it has become evident that in dissolving or opening out raw, or partly or wholly roasted cocoa-beans, or coarse fragments of same partly deprived of the shells or husks, the alkali-solution does not enter into the innermost parts thoroughly, even should the action be allowed to take place for a considerable length of time. The consequence is, that these innermost parts remain unopened, and that the greater part of the unmelted fat included in the cellular tissue remains unaffected, even by unusually strong alkaline solutions. Partly roasted fragments of cocoa-beans have to be subjected to a subsequent roasting in a humid state without the shells or husks, whereby in spite of the greatest precautions, empyreumatic gases penetrate the cellular tissue of the beans and give the product a disagreeable taste and smell, that can only be moderated by the aid of spices. If the treatment of the beans or fragments is carried on without the shells being removed the taste of the cocoa is also impaired and the addition of spices becomes necessary. When the cocoa-mass in a finely ground melted state is treated with alkaline solutions or with water, it is impossible to completely expel the confined moisture by evaporation, which in any case must be carried out with greatest precaution in order to maintain the aroma and to prevent the albumin from changing. The presence of moisture in the final product may lead to the creation of mold, which impairs the taste to such extent that again it is necessary to resort to spices.

It is usual to employ in the process of melting and disengaging the fat from the tissue cells horizontal grinding mills heated to a high temperature. This great heat together with the intense rubbing action, to which the slowly flowing cocoa-mass is subjected for an unduly long time, impairs the taste to a large extent, and therefore also makes the addition of spices necessary. Even the pressing according to the processes heretofore employed has injurious effects, not only on the quality of the fat or butter pressed out, but also on the taste of the cocoa. If cocoa-fragments or cocoa-kernels are pressed in the manner described in the German Patent No. 89251 the fat, it is true, is gained clear and clean, and by repeated disintegration and pressing it is possible to expel the necessary amount of fat even to produce cocoa destitute or poor of fat, however, it is absolutely impossible to obtain the desired degree of fineness of the constituents, free of fat to such a degree as is necessary to satisfy the highly refined taste, on account of the lack of a certain amount of fat, necessary for the adhesion on the surface of the grinding stones or rollers. Should an effort be made to obtain a certain degree of fineness by unduly long and permanent grinding, this can only be done at the expense of the aroma and good taste. If the pressing is carried out when the cocoa-mass is in a finely ground melted state, part of the tissue constituents will penetrate the piston or cover of the press into the cocoa butter or fat, thus making it necessary to purify and filter the latter, which is a troublesome task. Though a certain amount of fat is necessary for enabling a mechanical rubbing to the desired degree of fineness, the fat hereby also can (if present in a surplus amount) become such a hindrance that the desired fineness will not be arrived at in the grinding process. Neither a thin liquid cocoa-mass having its natural amount of fat, nor dry cocoa deprived of its oil or fat, is in a suitable condition for the highly important operation of rubbing to a high degree of fineness, because in the first instance the surplus fat makes it impossible to carry on the rubbing to the highest degree, and in the second instance the deficiency of fat during the rubbing operation results in altering the aroma and taste. These drawbacks are overcome by grinding the cocoa kernels or fragments obtained from roasting, breaking, peeling or hulling and cleansing operation, on fluted, roughened, or smooth polished rolls to a powder of the fineness of coarse meal at a temperature not exceeding 35° C., (the melting point of cocoa fat, which is contained in the cocoa kernels). This temperature is considered low in the art, in comparison with those higher temperatures, at which the cocoa fat turns into a liquid state, and at which cocoa kernels have been ground heretofore. The grinding rolls above described are arranged either side by side, or in pairs one over the other.

Should it be desired to allow alkalis, solutions of the same, or water, to act mainly on the fibers of the cellular tissue, the albumin or the starch of the cocoa, the cold cocoa powder is saturated in the liquid, which, according to the object of the product and according to the place of growth of the beans, is allowed to act on the same for a greater or smaller length of time in a cold or warm state. The moisture is then expelled by evaporation in suitable pans or receptacles, preferably in a vacuum, and then the mass is brought to the press. The evaporation, however, is only necessary when the powder has been treated with an alkali solution. The drawback incident to the usual treatment of fragments, wherein the alkaline solution does not enter the innermost parts of the cocoa fragments, is hereby overcome. Should it be desired to allow the alkalis to act on the fat to a greater extent, the cocoa powder is heated until the fat emerges from the single particles more or less to the desired degree before treatment with alkalis and the like is carried on. The drawback met with in operating on fully homogeneous melted and finely rubbed cocoa-mass (due to the impossibility of thoroughly expelling the water of the alkaline solution) is hereby completely avoided, because the porosity of the powder permits all moisture to easily evaporate. All further treatment of the cocoa in manufacturing the final product can be carried on to better advantage. If now the cocoa-mass, which still has a distinctly tangible grain, is given a pressure, it is quite impossible for the outer layers of the material under the press to become too dense and impermeable, as is the case with the fully finely-ground, melted cocoa-mass. The pressure given to the mass in the press is evenly distributed throughout and a sufficient number of minute cavities and fine channels are upheld, by which the cocoa fat finds its way out from the center of the body of the pressed material. If it is desired to obtain a final product that gives satisfaction in every respect, the main operation, i. e., rubbing to the desired degree of fineness should not take place before the beginning of the pressing operation nor after completing this operation, but the rubbing must be carried out after a preliminary pressing, that is, while there is still a certain amount of fat present sufficient for carrying out the rubbing operation. By this preliminary pressing the coarse pulverulent prepared material, brought into a pasty condition by heating the same, is deprived of so much of its fat that it attains a consistency and such a degree of adhesion that the mass during the subsequent rubbing action clings to the rolls of the rubbing machine. The limit to which the oil is to be expelled during the first pressing depends on the proportion of fat present in the different qualities of beans or mixture of beans used. When the desired degree of fineness is obtained by rubbing, once or repeatedly in the aforesaid manner, further pressing may be resorted to, and the pressure continued as long as desired. The press-body or cake thus produced is crushed or broken to pieces by any desired means, and then sifted or sized in any preferred way.

If it is desired to obtain unopened or undissolved cocoa, the process described above is modified by omitting the dissolving by aid of alkalis and the evaporation to expel the moisture, but without varying the sequence of grinding, preliminary pressing, rubbing to the desired degree of fineness, and subsequent or final pressing.

From the foregoing it will be understood that as a specific example, the process may be carried out as follows:—The cocoa-kernels or fragments, roasted, hulled and cleaned in any well known manner, are ground to a powder of the fineness of coarse meal. Thereupon a certain amount of moisture is expelled by pressing the ground material in a press-box of known description to a certain extent, that is to say, to such an extent that sufficient fat is left to maintain a slightly fatty consistency in the pressed mass, which is necessary for carrying out the next operation. The material thus partly pressed is now rubbed to an absolutely fine and homogeneous mass in a suitable machine, whereupon it is finally pressed. If the coarse meal is subjected to the action of alkalis it is necessary to expel the moisture by evaporation before pressing. If it is desired to increase the action of the alkalis the coarse meal is heated.

I claim:—

1. The method of producing cocoa-powder consisting in grinding roasted, hulled and cleaned cocoa-kernels or fragments to the fineness of coarse meal, pressing the ground material until only sufficient fat remains to maintain a slight fatty consistency, rubbing the pressed mass to a greater degree of fineness, and finally pressing the rubbed mass.

2. The method of producing cocoa-powder, consisting in grinding at low temperature roasted, hulled and cleaned cocoa kernels or fragments to the fineness of coarse meal, pressing the ground material until only sufficient fat remains to maintain a slight fatty consistency, rubbing the pressed mass to a greater degree of fineness, and finally pressing the rubbed mass.

3. The method of producing cocoa-powder, consisting in grinding at low temperature roasted, hulled and cleaned cocoa-kernels or fragments, to the fineness of coarse meal, subjecting the ground material to the action of alkalis, expelling the moisture by evaporation, pressing the material thus treated until only sufficient fat remains to maintain a slight fatty consistency, rubbing the pressed mass to a greater degree of fineness, and finally pressing the rubbed mass.

4. The method of producing cocoa-powder, consisting in grinding at low temperature roasted, hulled and cleaned cocoa-kernels or fragments to the fineness of coarse meal, heating the powdered material, subjecting the heated material to the action of alkalis, expelling the moisture by evaporation, pressing the material thus treated until only sufficient fat remains to maintain a slightly fatty consistency, rubbing the pressed mass to a greater degree of fineness and finally pressing the rubbed mass.

FRIEDRICH ERNST FERDINAND NEUMANN.

Witnesses:
CHARLES HARRY ROECKNER,
ERNEST H. L. MUMMENHOFF.